US012679646B1

(12) United States Patent
Malshe et al.

(10) Patent No.: US 12,679,646 B1
(45) Date of Patent: Jul. 14, 2026

(54) MOTORIZED CARTS FOR PICKING AND STAGING PACKAGES AND DOUBLING UP CAPACITY BY MOTORIZED STACKING

(71) Applicant: Amazon Technologies, Inc., Seattle, WA (US)

(72) Inventors: Rohit Malshe, Kirkland, WA (US); Srushti Vijay Khade, Bellevue, WA (US); Ankith Bommaganti Suresh, Redmond, WA (US); Prafful Bhardwaj, Covington, WA (US); Adityanarayan Samant, Nashville, TN (US)

(73) Assignee: Amazon Technologies, Inc., Seattle, WA (US)

( * ) Notice: Subject to any disclaimer, the term of this patent is extended or adjusted under 35 U.S.C. 154(b) by 347 days.

(21) Appl. No.: 18/218,685

(22) Filed: Jul. 6, 2023

(51) Int. Cl.
B65G 1/04 (2006.01)
B62B 3/02 (2006.01)
(Continued)

(52) U.S. Cl.
CPC .............. B65G 1/0492 (2013.01); B62B 3/02 (2013.01); B62B 3/04 (2013.01); B62B 5/004 (2013.01);
(Continued)

(58) Field of Classification Search
CPC ........... B65G 1/0492; B62B 3/02; B62B 3/04; B62B 5/004; B62B 5/0069; B62B 2203/10; B66F 9/0755; B66F 9/0759
See application file for complete search history.

(56) References Cited

U.S. PATENT DOCUMENTS 6,908,000 B2 * 6/2005 Craft .................... A47B 81/002
211/144
6,948,900 B1 9/2005 Neuman
(Continued)

FOREIGN PATENT DOCUMENTS

CA 3140104 A1 * 12/2020 ............. B62D 63/02
CN 108482445 A * 9/2018 ............... B62B 3/02
(Continued)

OTHER PUBLICATIONS

U.S. Appl. No. 18/218,690, Patent Application, "Cart With Tiltable Shelf", filed Jul. 6, 2023, 43 pages.

*Primary Examiner* — Babar Sarwar
(74) *Attorney, Agent, or Firm* — Kilpatrick Townsend & Stockton LLP

(57) ABSTRACT

A cart system for inventory management can include a cart frame including a base, a handle to control movement of the cart frame, a stationary shelf, and a movable shelf disposed above the stationary shelf. The movable shelf is movable in a path of travel vertically overhead of the stationary shelf to change a volume underneath the movable shelf to stack items over each other within the volume and supported by the stationary shelf. A height adjustor can be configured to lower or raise the movable shelf in a vertical direction to an ergonomic height for loading the items and a storage height to store the items while creating sufficient volume below the movable shelf loading the items on the stationary shelf. A cart controller can be configured to receive a height input, and control the height adjustor based on the height input.

20 Claims, 12 Drawing Sheets

(51) Int. Cl.
    *B62B 3/04*        (2006.01)
    *B62B 5/00*        (2006.01)
    *B66F 9/075*       (2006.01)

(52) U.S. Cl.
    CPC .......... *B62B 5/0069* (2013.01); *B66F 9/0755* (2013.01); *B66F 9/0759* (2013.01); *B62B 2203/10* (2013.01)

(56) References Cited

U.S. PATENT DOCUMENTS

| | | | | |
|---|---|---|---|---|
| 7,408,314 | B2 * | 8/2008 | Hayashi | B66F 9/24 187/222 |
| 9,073,736 | B1 | 7/2015 | Hussain et al. | |
| 9,420,900 | B1 | 8/2016 | Simpson et al. | |
| 9,656,806 | B2 | 5/2017 | Brazeau et al. | |
| 9,809,384 | B2 | 11/2017 | Mountz et al. | |
| 10,640,347 | B2 * | 5/2020 | Shah | B66F 9/0755 |
| 2012/0191272 | A1 * | 7/2012 | Andersen | G06Q 10/087 705/28 |
| 2016/0236869 | A1 | 8/2016 | Kimura et al. | |
| 2017/0174431 | A1 * | 6/2017 | Borders | B65G 67/22 |
| 2019/0119083 | A1 * | 4/2019 | High | E01H 5/061 |
| 2019/0373476 | A1 * | 12/2019 | High | G06Q 10/08355 |
| 2020/0156868 | A1 * | 5/2020 | Bidram | B65G 1/0492 |
| 2020/0183371 | A1 * | 6/2020 | Park | G05B 19/41895 |
| 2020/0331699 | A1 * | 10/2020 | Sullivan | B65G 1/0492 |
| 2020/0401133 | A1 * | 12/2020 | Armbrust | B62D 63/02 |
| 2021/0009352 | A1 * | 1/2021 | Jarvis | B65G 1/1375 |
| 2021/0333791 | A1 * | 10/2021 | Takao | G05D 1/0214 |
| 2022/0067960 | A1 * | 3/2022 | Guo | G06T 7/62 |
| 2022/0250841 | A1 * | 8/2022 | Dayrell | B65G 1/0471 |
| 2022/0402699 | A1 * | 12/2022 | Schauer | B65G 1/0435 |
| 2023/0116127 | A1 * | 4/2023 | Iellimo | B65G 1/065 211/134 |
| 2023/0161348 | A1 * | 5/2023 | Lin | B66F 9/24 701/23 |
| 2024/0010255 | A1 * | 1/2024 | Smith | B62B 5/0033 |
| 2024/0025464 | A1 | 1/2024 | Long et al. | |
| 2024/0300740 | A1 | 9/2024 | Sevigny et al. | |
| 2024/0415280 | A1 * | 12/2024 | Whitta | A47B 47/0091 |
| 2025/0178655 | A1 | 6/2025 | Sevigny et al. | |
| 2025/0216863 | A1 * | 7/2025 | Armbrust | G06V 40/174 |

FOREIGN PATENT DOCUMENTS

| | | | | | |
|---|---|---|---|---|---|
| CN | 108715179 | A | * | 10/2018 | B62B 3/02 |
| CN | 109987124 | A | * | 7/2019 | B62B 3/02 |
| CN | 111284539 | A | * | 6/2020 | B62B 5/00 |
| CN | 111348361 | A | * | 6/2020 | B65G 1/1373 |
| CN | 210852568 | U | * | 6/2020 | B62B 3/02 |
| CN | 111392301 | A | * | 7/2020 | B65G 1/1373 |
| CN | 111661119 | A | * | 9/2020 | B62B 3/02 |
| CN | 112389921 | A | * | 2/2021 | B65G 1/0492 |
| CN | 113184422 | A | * | 7/2021 | B65G 1/137 |
| CN | 110962902 | B | * | 12/2021 | B62B 5/00 |
| CN | 113753451 | A | * | 12/2021 | B65G 1/0492 |
| CN | 114524217 | A | * | 5/2022 | B65G 1/0407 |
| CN | 115158935 | A | * | 10/2022 | B65G 1/1371 |
| CN | 115215034 | A | * | 10/2022 | B65G 1/12 |
| CN | 116040188 | A | * | 5/2023 | B65G 1/0407 |
| CN | 220244393 | U | * | 12/2023 | |
| CN | 222486608 | U | * | 2/2025 | |
| DE | 102022118969 | A1 | * | 2/2024 | B65G 65/00 |
| JP | 2021086196 | A | * | 6/2021 | B62B 5/0069 |
| JP | 7396506 | B2 | * | 12/2023 | B65G 1/1373 |
| KR | 101300164 | B1 | * | 9/2013 | B62B 3/14 |
| KR | 20220094748 | A | * | 7/2022 | B62B 3/0625 |
| KR | 102433786 | B1 | * | 8/2022 | B62B 5/0036 |
| KR | 102821134 | B1 | * | 6/2025 | B65G 1/137 |
| KR | 102861405 | B1 | * | 9/2025 | B65G 1/1375 |
| WO | WO-2021063412 | A1 | * | 4/2021 | B25J 9/1697 |
| WO | WO-2023115090 | A1 | * | 6/2023 | E06C 9/06 |

* cited by examiner

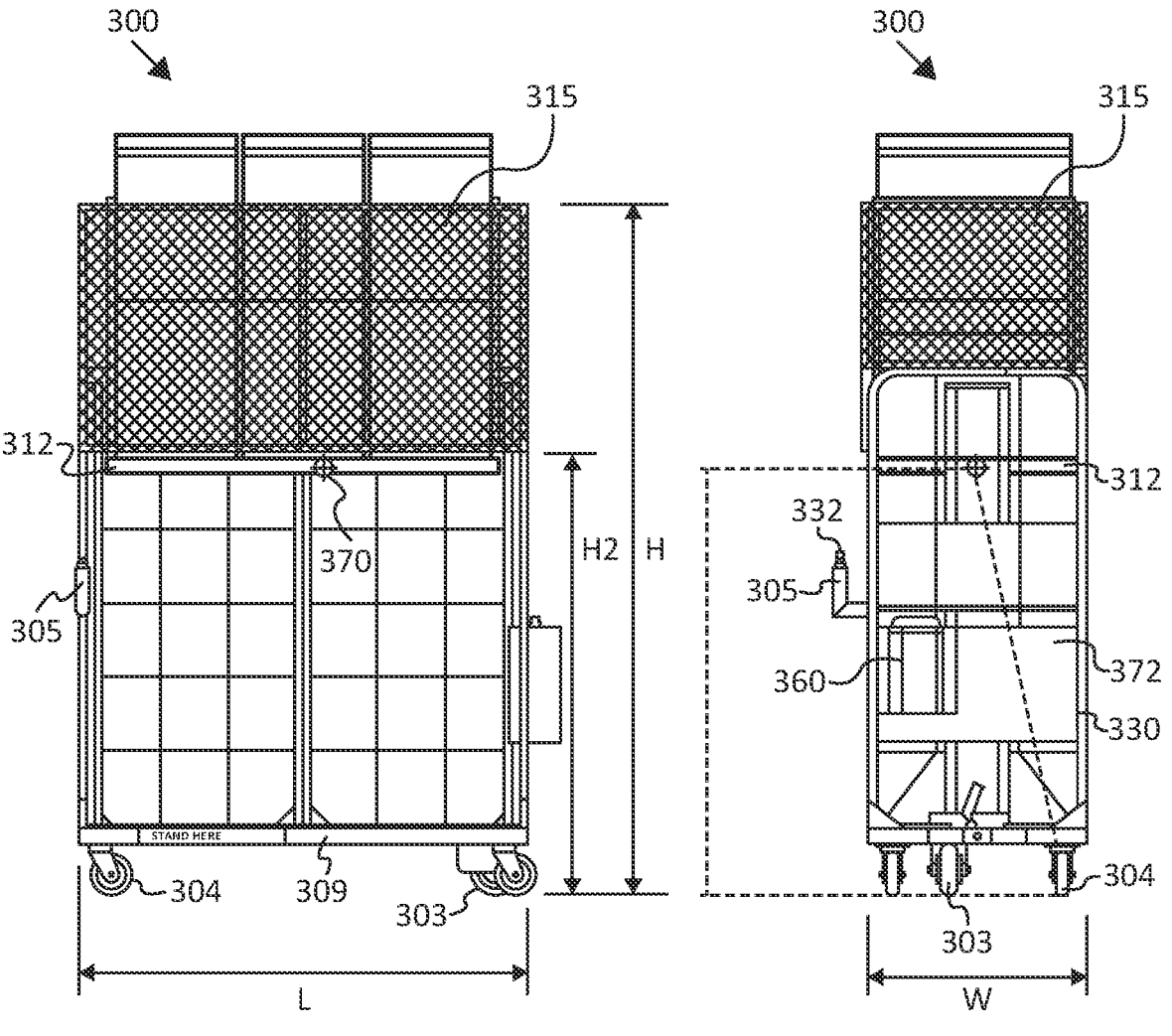
FIG. 4                    FIG. 5

MOTORIZED CARTS FOR PICKING AND STAGING PACKAGES AND DOUBLING UP CAPACITY BY MOTORIZED STACKING

BACKGROUND

Inventory systems, such as those in warehouses, supply chain distribution centers, airport luggage systems, and custom-order manufacturing facilities, face significant challenges in transporting inventory items. As inventory systems grow, the challenges of simultaneously completing a large number of tasks such as packing, storing, picking, staging, and other inventory-related tasks become non-trivial. One of the operations in the inventory system can involve picking and staging packages to a delivery station. This may entail picking containers filled with items from the inventory or oversize (OV) packages and placing them on a cart. The cart is then pushed by an operator to a specified staging location for dispatch. The routes and space for moving the cart from a pickup area to a staging area can be restricted to existing cart sizes and layout of pickup and staging area.

In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems may require significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIG. 4 illustrates a side view of the cart system of FIG. 3.

FIG. 5 illustrates a front view of the cart system of FIG. 3.

DETAILED DESCRIPTION

Figure 1:
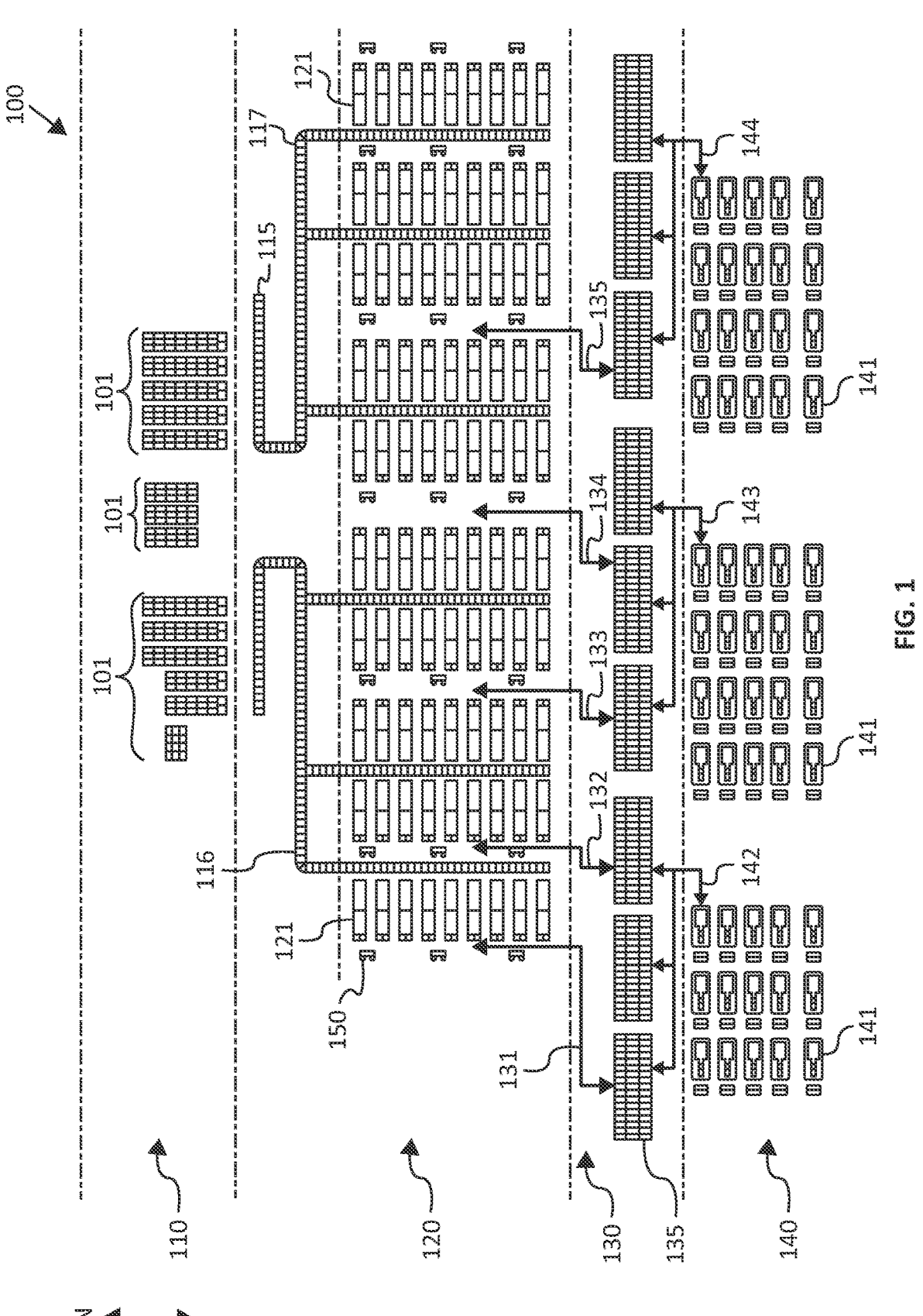
FIG. 1 is an example inventory system configured for a pick-and-stage operation, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Carts are used for transferring containers including items, packages, household goods, or other items from one location to another. In an inventory system application, carts can be employed in pick-and-stage operation. In this operation, pick-and-stage associates or operators bring carts from staging areas to stow-aisles adjacent to inventory holders, and load items in those inventory holders to a cart. Usually, the inventory holders are created for storage, and are fully static. Carts are created for movement within the inventory system and parked in the staging area. These carts are manually maneuvered and configured to carry only a limited number of items. With increasing demand for fast and efficient inventory systems, increasing demand for throughput, and/or providing safe and less strenuous work environment, improved inventory apparatuses and systems are developed.

The present disclosure provides a cart system configured to substantially increase item carrying capacity and easy of handling of carts. A cart system can be a motorized cart system, including a cart frame with a stationary shelf and a movable shelf. The movable shelf can be movably stackable on top of the stationary shelf. Each of the shelves can receive one or more picked up items. The movable shelf can be powered by a battery whose height can be adjusted to an operator's waist level, shoulder level, or other levels and makes it much safer for the operator while having increased (e.g., twice) as much capacity. The cart system can further include a motorized wheel to easily or effortlessly move the cart frame, and a height adjustment assembly may automatically move the movable shelf.

The height adjustment assembly can include a lift. The lift can be coupled to the movable shelf and configured to control the movable shelf along a vertical direction. The lift can be configured to lower the movable shelf to a first height (e.g., corresponding to an ergonomic loading position) for loading a first set of items onto the movable shelf, and to raise the movable shelf to a second height (e.g., a storage height) above the first height in the vertical direction to facilitate loading of a second set of items onto the stationary shelf beneath the movable shelf. Thus, raising the movable shelf to a storage height allows additional space for loading more items on the cart frame.

The cart system can further include a cart controller configured to receive the drive input (e.g., from the joystick) and a height input associated with the movable shelf. The cart controller can control the motorized wheel, and the lift based on the drive input and the height input, respectively.

The cart frame can include a base at a bottom level and a handle. The motorized wheel and swivel wheels can be attached to the base. The handle can include a joystick to provide a drive input to the motorized wheel to propel the cart frame over a surface. Thus, any operator can easily move a heavily loaded cart frame with ease by simple drive inputs to the joystick and minimal push/pull forces. In some embodiments, the height adjustment assembly can include a lock configured to secure the movable shelf at a specified height.

Advantageously, the motorized cart system can allow for optimal storage of containers. For example, the cart's capacity can be doubled or more by accommodating two shelves: a stationary shelf and a movable shelf, which can be stored at the waist or shoulder height of the operator. Furthermore, the cart enables the operator to easily or effortlessly adjust a height of a movable shelf, so that a second set of items can be stacked at the same level as the first. This mechanism allows for the implementation of a cart that is approximately two times taller than without a movable shelf capability. This way, a cart can be doubled in item carrying capacity. As a result, the cart system can potentially deliver more items in a single trip between the pickup area and the stationary area than traditional carts, making it a smarter and more efficient option for item delivery. In many embodiments, the components of the cart system can be retrofitted to an existing cart to improve its item carrying capacity and driving effort.

FIG. 1 is an example inventory system 100 configured for a pick-and-stage operation, according to various embodiments. The inventory system 100 can include a receiving area 110, a pickup area 120, and a staging area 130. Beyond the staging area 130, a delivery vehicle area 140 can be located, where a plurality of delivery vehicle 141 can be parked. In the illustrated embodiment, the areas 110, 120, and 130 can be arranged to transport items from a first direction (e.g., north end (N)) to a second direction (e.g., south end(S)). For example, a plurality of items 101 can be received at the receiving area 110 (e.g., at the north end N) and transported to the pickup area 120 via a set of conveyors 115, 116. The pickup area 120 can include a plurality of inventory holders 121. In the illustrated embodiment, multiple inventory holders 121 are arranged in each column. The inventory holders 121 can receive items 101 of different sizes and shapes. These items 101 can be transported on the conveyor 115, 116. For example, on a left side, the conveyor belt 115 can include multiple conveyor belts arranged to create parallel routes to different inventory holders 101. Similarly, on a right side, the conveyor belt 116 can include multiple conveyor belts arranged to create parallel routes to different inventory holders 101. The present disclosure is not limited to the illustrated embodiment and other transport means (e.g., mobile robots, and robotic transfer apparatuses) and routes are possible.

Within the pickup area 120, an operator (not illustrated) can pick up one or more items 101 to be delivered from one or more of the inventory holders 101 and place them on a cart 150. In many embodiments, the items 101 to be delivered may be loaded in a container or a bag (e.g., shown in FIG. 6). Multiple such loaded containers can be placed on the cart 150. A loaded container can be heavy (e.g., 30 lbs-50 lbs). Lifting the loaded containers repeatedly and placing them on the cart 150 can be strenuous for the operator. Additionally, lifting the container above a shoulder height can be particularly difficult. Hence, lifting and placing the containers in an ergonomic loading position (e.g., a waist height) is desired. Once a cart 150 is loaded, the cart 150 can be pushed around and guided to the staging area 130.

The carts 150 can be routed through paths 131-135. For example, the paths 131-135 can be through limited spaces between the inventory holders 101 and/or around other carts or apparatuses disposed within the picking area 120 or the staging area 130. As such, the paths 131-135 can include snake-like or curved portions to navigate the cart 150 without colliding with other objects (e.g., inventory holders, carts, or other devices) within the picking area 120 or the staging area 130. The carts 150 herein are configured to facilitate navigation through these paths 131-135 easily and/or effortlessly.

The staging area 130 can include a plurality of designated spaces 135, where each space 135 is configured to park a cart 150 (e.g., loaded with items 101, such as within containers). Each designated space 135 can divided into smaller spaces sized to park the cart 150 and the cart space can have a location identifier. The location identifier can be a lot number (e.g., A-Z) and a space number (e.g., 1-50). Each cart 150 can be associated with a location identifier of a designated space 135 so that the carts 150 can be parked in their assigned spots within the staging area 130. From the staging area 130, one or more carts in the designated spaces 135 can be selected to load a particular delivery vehicle 141. In some embodiments, each cart 135 can be further associated with a particular delivery vehicle 141. Each delivery vehicle 141 may follow a delivery route with a set of addresses to which items from the selected carts 150 are assigned to be delivered.

In many embodiments, the carts herein are configured to facilitate advantageous loading or unloading positions (e.g., at waist level) when picking up or unloading items. Additionally, the carts herein have multiple shelves to increase the capacity (e.g., double or triple) compared to existing carts. A shelf can be movable and can be lowered to a loading position. Subsequently, the shelf can be raised above a shoulder height of the operator. This way, the cart facilitates easy loading and unloading positions for an operator while increasing (e.g., doubling or more) an item carrying capacity compared to traditional carts. A loaded cart can be difficult to push/pull and navigate around tight spaces, such as around the inventory holders 101. Additionally, or alternatively, the carts herein can be motorized (e.g., via a motorized wheel) to facilitate easy navigation with minimal push/pull force.

Figure 2:
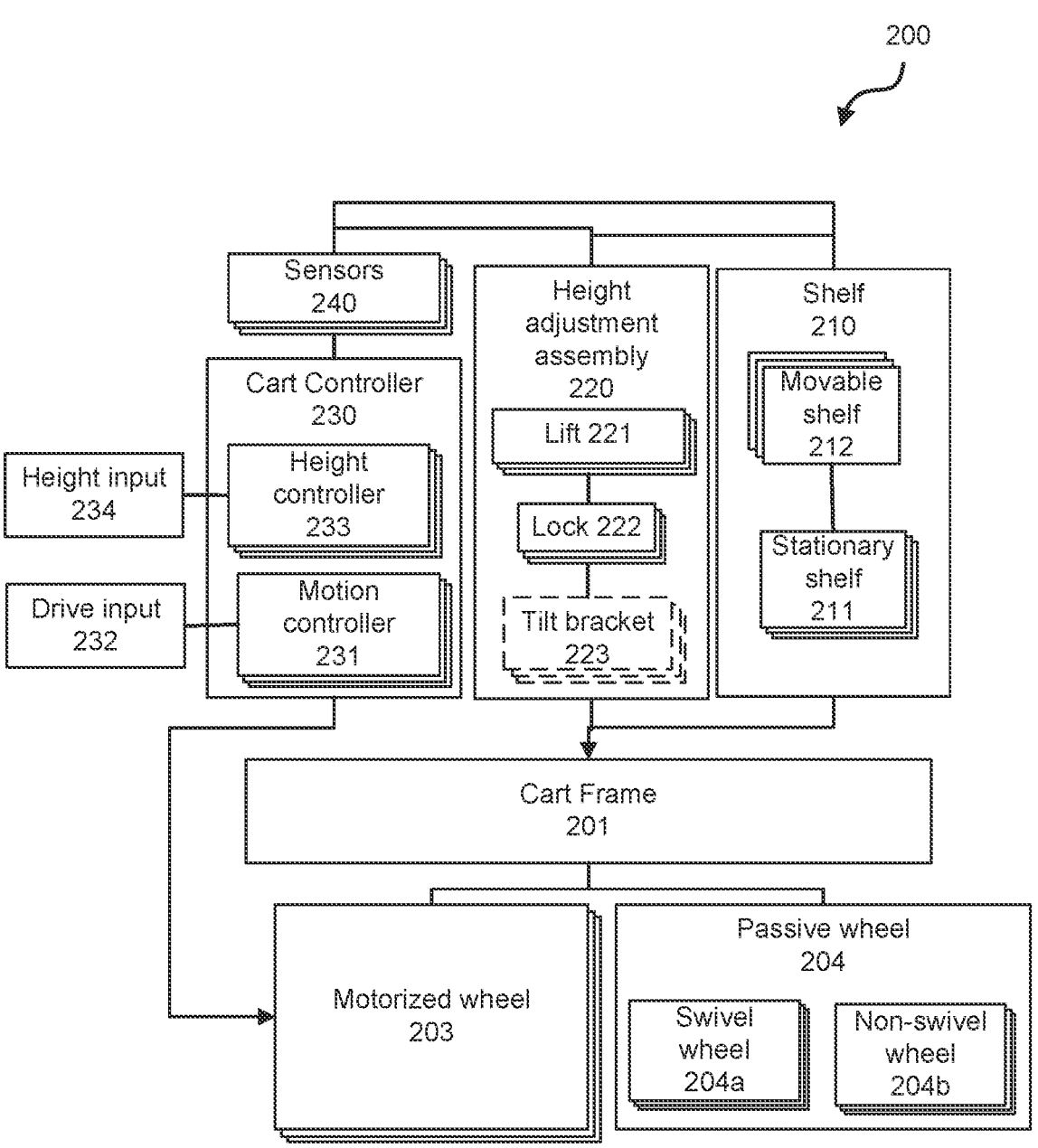
FIG. 2 is a block diagram of a cart system, according to various embodiments.

FIG. 2 is a block diagram of a cart system 200, according to various embodiments. The cart 150 (in FIG. 1) can be an example of implementation of the cart system 200. In many embodiments, the cart system 200 can include a cart frame 201, a height adjustment assembly 220, and a cart controller 230. The cart frame 201 includes or supports structure that is configured to store and carry containers therein. In many embodiments, the cart frame 201 can include shelves 210 for receiving containers. The containers may be stacked on top of each other. The shelves 210 can include a stationary shelf 211, and one or more movable shelf 212 disposed over the stationary shelf 211. The movable shelf 211 can be raised or lowered by the height adjustment assembly 220. The containers can be loaded on the movable shelf 212 and raised to a higher level to load additional containers on the stationary shelf 211 (e.g., underneath the movable shelf 212 and/or in a space vacated by the movable shelf 212). The movable shelf 212 allows containers or items to be loaded on the cart frame 201 at an ergonomic position for an operator and further store the containers at higher heights to load additional containers.

In many embodiments, the cart frame 201 can include a motorized wheel 203 and one or more passive wheels 204 to facilitate controlled movement of the cart frame 201 from one location to another (e.g., from the pickup area 120 to the staging area 120 in FIG. 1). In some embodiments, the motorized wheel 203 can be driven by a motor. The motorized wheel 203 can be configured to move in a forward or a backward direction along a straight line. Additionally, or alternatively, the motorized wheel 203 can be configured to swivel in any direction to facilitate tight turns around objects along a travel path of the cart frame 201. The passive wheels 204 may be non-motorized. The passive wheels 204 may include one or more swivel wheels 204a and/or non-swivel wheels 204b. The swivel wheels 204a may swivel to facilitate turns. The passive wheels 204 may include two swivel wheels 204a at one end opposite two non-swivel wheels 204b, may include four swivel wheels 204a and zero non-swivel wheels 204b, or may include any other suitable combination of two swivel wheels 204a and non-swivel wheels 204b.

In many embodiments, the height adjustment assembly 220 can include a height adjustor e.g., a lift 221 or a tilt bracket 223 configured to lower or raise at least a portion of the movable shelf 212 to a first height, a second height, or other heights along a vertical direction. For example, the height adjustment assembly 220 can move the movable shelf 212 to an ergonomic height for loading items or a storage height to store the items while creating sufficient volume below the movable shelf 212 for stacking items on the stationary shelf 211. The lift 221 can raise or lower the movable shelf 212 in a planar manner. The tilt bracket 223 can tilt the movable shelf 212 to raise or lower at least one end or other portion of the moveable shelf 212 with respect to the stationary shelf 211. Additionally, or alternatively, the height adjustor 220 can include a lock 222 configured to secure the movable shelf 212 at any specified height. For example, the lift 221 can include a vertical rod and the lock 222 may include a retractable pin and hole arrangement. An example lift based height adjustment assembly is further discussed in detail with respect to FIGS. 3-6. As another example, the tilt bracket 223 may include holes at different heights engageable with a retractable rod that forms the lock 222. An example tilt-based height adjustment assembly is further discussed in detail with respect to FIGS. 7-14.

In many embodiments, the cart controller 230 can include a height controller 233 and/or a motion controller 231. The motion controller 231 can be configured to receive a drive input 232 (e.g., via a joystick, steering device, throttle, or other user interface). Based on the drive input 232, the cart controller 230 can control the motorized wheel 203 to navigate the cart frame 201 to a particular location (e.g., a cart parking space 135 in the staging area 130 in FIG. 1). The height controller 233 can be configured to receive a height input 234 (e.g., via button, touchscreen, lever, handle, or other user interface) associated with the movable shelf 212. Based on the height input 234, the cart controller 230 can control the height adjustor (e.g., the lift 221) to move the movable shelf 212 to a height corresponding to the height input 234. For example, the height input 234 may indicate moving to an ergonomic position, a storage position, or other intermediate positions. In many embodiments, a controller can be one or more processors including memory with instructions stored thereon to perform the functions of the cart controller 230.

The cart system 200 can further include one or more sensors 240 disposed on the cart frame 201, the stationary shelf 211, the movable shaft 212, and/or other appropriate locations. The one or more sensors 240 can include a pressure sensor to determine a total weight of the containers on a shelf, an object detection sensor to detect obstacles around the cart frame, another object detection sensor to detect presence of an object (e.g., inventory items 101 and/or human body portions) between the movable shelf 212 and the stationary shelf 211. In many embodiments, the sensor data can be transmitted to the cart controller 230 to control the height adjustment assembly 220 and/or the motorized wheel 203. Based on the input from the sensors 240, the cart controller 230 can be configured to control the motorized wheel 203 to avoid collision with an obstacle, and/or to control the height adjustment assembly 220 to avoid collision with a human body part and/or collision with inventory items 101 that may be present in the cart system 200. For example, based on the inputs from the sensors 240, the cart controller 230 may transmit a stop command to the motorized wheel 203 or the height adjustment assembly 220.

Figure 3:
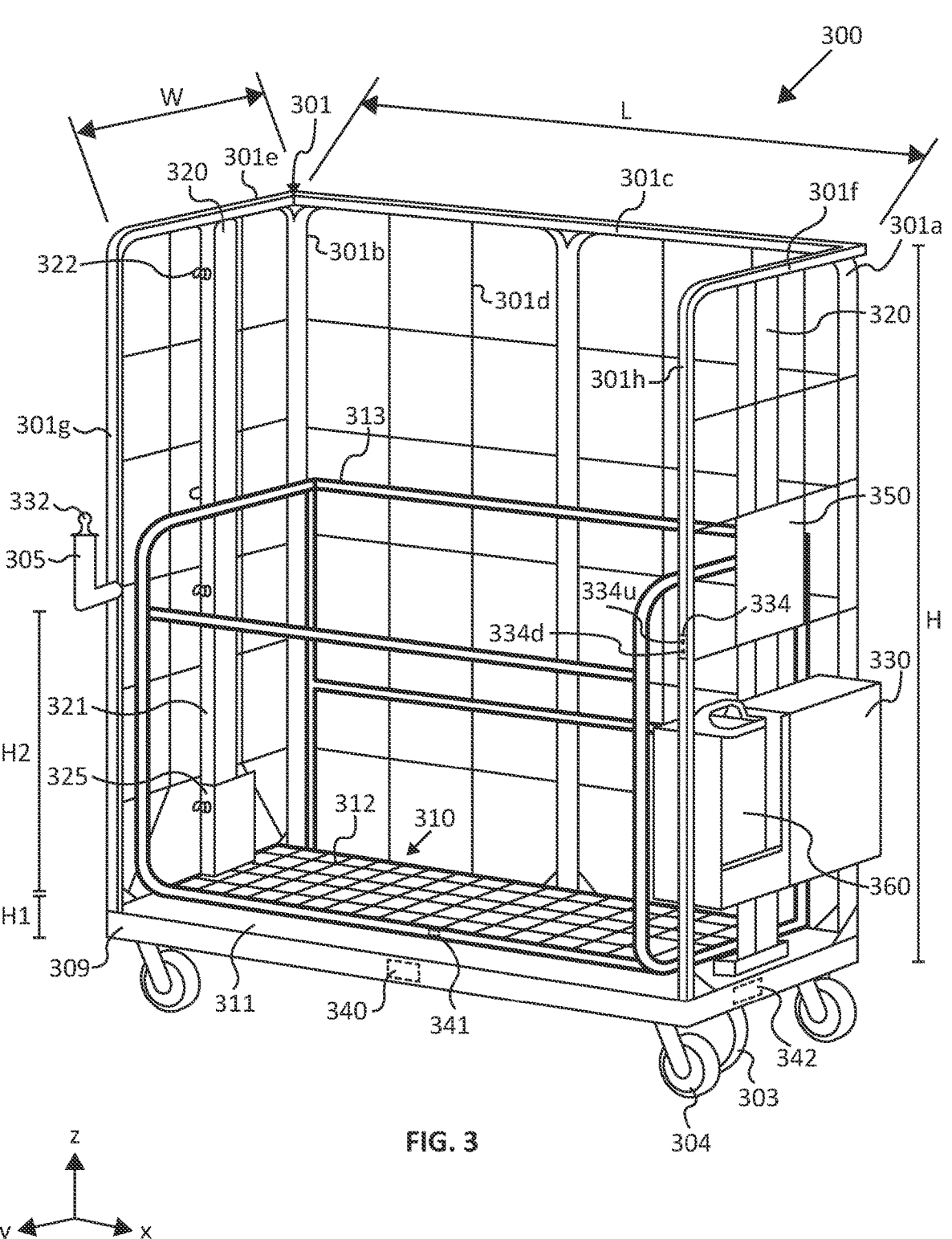
FIG. 3 illustrates an example cart system of FIG. 2 employing a lift for moving a shelf.

FIG. 3 illustrates a cart system 300, which can be an example implementation of the cart system 200 employing a lift. FIG. 4 and FIG. 5 illustrate a side view and a front view, respectively, of the cart system 300. The cart system 300 can include a cart frame 301, and a lift 320 coupled to the cart frame 301. The cart frame 301 can include a handle 305 to control movement of the cart frame 301, a base 309, a stationary shelf 311, and a movable shelf 312. The base 309 can be at the bottom level and the stationary shelf 311 can be supported by or incorporated into the base 309. The cart frame 301 can be coupled with a motorized wheel 303, and passive wheels 304 (e.g., two, three, four, five wheels, or more total wheels). For example, the wheels 303, 304 can be coupled below the base 309 of the cart frame 301. The motorized wheel 303 can be motor-driven (not illustrated) and powered by a battery or other suitable power source, while the swivel wheels 304 simply follow along.

The cart system 300 can be controlled by a cart controller 330 and powered by a battery 360. The battery 360 may be easily swapped out (e.g., with battery from FIG. 15) when needed, e.g., when the battery is discharged or the battery is faulty or unable to provide sufficient power to drive the cart frame 301. In the illustrated embodiment, the cart controller 330 can include a circuit board comprising a motion controller (e.g., 231) and a height controller (e.g., 233) disposed within a box. The cart controller 330 may also control functions related to the battery 360 such as charging, and/or battery bypass. In some embodiments, the cart controller 330 can include a bypass switch to bypass automated operation of the motorized wheel 303 so that the cart frame 301 can be manually driven. For example, such battery bypass switch may be activated when the battery is discharged or other motorized failure of the motorized wheel 303.

In the illustrated embodiments, the movable shelf 312 can be disposed above the stationary shelf 311 and movable with respect to the stationary shelf 311. For example, the movable shelf 312 is moveable in a path of travel vertically (e.g., along z-direction) overhead of the stationary shelf 311 to change a volume between the movable shelf 312 and the stationary shelf 311. Items are stackable over each other within this changing volume and supported by the stationary shelf 311 (see also FIG. 6). Items additionally or alternatively can be placed on the movable shelf 312. In many embodiments, the movable shelf 312 can be coupled to the lift 320 to automatically move the moveable shelf 312 in loaded or unloaded states. For example, the operator may load the moveable shelf 312 while the movable shelf 312 is lowered and then control the moveable shelf 312 to raise for moving a first set of items into an elevated storage state and for simultaneously providing access to the stationary shelf 311 for loading. Thus, an operator can easily cause the items to reach a position above the shoulder level or overhead without physically lifting individual items above a waist level. This significantly reduces operatory fatigue or accidental dropping of items.

The cart frame 301 can include elongated frame elements 301a-301h connected together to form a rectangular cage-like structure, however other structures are possible. Several of the frame elements (e.g., 301a, 301b, 301g, and 301h) can extend vertically from the base 309. The cart frame 301 can be bounded by a rear portion (e.g., elements 301a-301d), side portions (e.g., 301a, 301g, 301b, 301h), and a bottom portion (e.g., the base 309). A front side of the cart frame 301 can be open to receive containers on the shelves 311, 312. A top side of the cart frame 301 can also be open to allow vertical movement of the movable shelf 312, although a roof or other top or cap can be utilized.

The cart frame 301 can have a length L, a height H, and a width W. In some embodiments, dimensions of the cart frame 301 can be determined based on location of a center of gravity 370 (e.g., illustrated in FIG. 4 and FIG. 5) associated with a cart loaded to its maximum capacity. In some examples, the dimensions L, H, and W are associated with a tipping angle 372 (see FIG. 5). In the illustrated example, the tipping angle 372 can be an angle between a vertical axis and the center of gravity 370. As an example, the tipping angle 372 can be approximately 12 degrees, however higher angles are possible. In other words, a fully loaded cart will not tip until the tipping angle (e.g., 12 degrees or other threshold) is reached. Different components (e.g., in FIG. 2) can be attached to the cart frame 301 to form the cart system 300.

The cart frame 301 can include the handle 305 attached to or integrally formed with the side frame element 301g on the front side of the cart frame 301. The handle 305 can be gripped to steer the cart frame 301 in a desired direction. To facilitate better gripping, the handle 305 may include a grip (not illustrated) made of e.g., a foam cover, a rubber cover, or other gripping elements. In many embodiments, the handle 305 can include a joystick 332, which can be an example of a user interface for providing the drive input 232 (e.g., illustrated in FIG. 2). In some embodiments, the handle 305 can include the motion controller (e.g., 234 of FIG. 2). In some embodiments, the motion controller (e.g., 234 of FIG. 2) can be disposed within the cart controller 360. As discussed herein, the motion controller (e.g., 234) can be configured to send signals to the motorized wheel 303 to propel the wheel 303 in a forward or a reverse direction based on inputs from the joystick 332. The passive wheels 304 can be used to manually change directions, while driven by the motorized wheel 303. The handle 305 can be located at a waist level, shoulder level, or other level that is comfortable for an operator to push or pull the cart frame 301 by gripping the handle 305. It can be understood that the present disclosure is not limited to a number of wheels and any combination of passive wheels and motorized wheel is possible. For example, all four passive wheels 303 (or subset thereof) may be replaced with motorized wheels, and a fifth motorized wheel 304 may be omitted.

The lift 320 can be coupled at different locations of the cart frame 301. The lift 320 can be fixedly installed on or can be part of the side portions of the cart frame 301. In some embodiments, the lift 320 can include a first lift and a second lift (collectively referred as the lift 320) positioned at opposite sides (e.g., a left side and a right side). For example, as illustrated, the left side lift 320 can be coupled to a left portion of the movable shelf 312 and the right-side lift 320 can be coupled to a right portion of the movable shelf 312 such that the lift portions do not project into a storage volume where containers can be stored. Alternatively, the lift 320 may be located at other locations such as the rear portion, corner portions (e.g., along 301a, 301b), or other appropriate location that does not obstruct loading of containers or items on the shelves 311, 312.

In some embodiments, the lift 320 can be actuated via a height adjustment interface 334 attached to a frame element of the cart frame 301. The height adjustment interface 334 can remain in a fixed position on the frame element (e.g., 301h) while the movable shelf 312 moves in a vertical direction. In other words, the height adjustment interface 334 does not move along with the movable shelf 312 so that the operator can adjust the height from a waist level even if the movable shelf 312 is overhead. The height adjustment interface 334 can include an up button 334U to move the movable shelf 312 vertically upward, and a down button 334D to move the movable shelf 312 vertically downward. Actuating the button 334U, 334D can send a height adjustment signal to the height controller (e.g., 233) of the cart controller 330. The height adjustment interface 334 can be accessible to an operator at a waist level when standing by the cart frame 301 regardless of whether movable shelf 312 is up (e.g., above shoulder height) or down (e.g., at the level of stationary shelf).

Based on the height adjustment signal, the height controller can actuate the lift 320 to move the movable shelf 312 in up or down direction. For example, the movable shelf 312 can be moved to a first height H1 that may be just above the stationary shelf 311 or at another position suitable to load containers on the movable shelf 312. The movable shelf 312 can be moved to a second height H2 thereby creating a volume below the movable shelf 312 to load additional containers on the stationary shelf 311. The lift 320 can be configured to maintain the movable shelf 312 in a planar position while loading the items or translating the movable shelf 312 along the vertical direction. For example, both the lifts 320 move simultaneously at a same speed so that the movable shelf 312 remains planar (e.g., flat, horizontal, and/or non-tilting) while moving.

In some embodiments, the lift 320 can include a lead screw 321 oriented in a vertical direction. The lead screw 321 may be threadingly coupled to panels 325 which can be fixed to the movable shelf 312. As the lead screw 321 rotates, the panel 325 (and the movable shelf 312) travel along the lead screw 321 in a vertical direction. The lead screw 321 may be driven by a motor (not illustrated) to rotate the screw in a clockwise or counterclockwise direction, e.g., causing the movable shelf 312 to raise or lower in a vertical direction. Alternatively, the lift 320 can be a hydraulically or pneumatically actuated rod, a chain and sprocket driven by a motor, a belt and pulley system coupled to a guide rail, or other lift systems configured to impart movement of the movable shelf 312 relative to the cart frame 301.

In some embodiments, the lift 320 may include a lock 322 to secure the movable shelf 312 at any specified height. As an example, the lock 322 may include a set of retractable pins vertically spaced at different heights along the lift 320. The lift 320 can include holes corresponding to each of the retractable pins to lock the movable shelf 312 in a particular position.

In some embodiments, the cart system 300 can include additional components to provide additional functionality or improved safety. For example, the movable shelf 312 may further include a guard 313 extending at least partially around a circumference of the movable shelf to avoid items from falling off the movable shelf 312 when in motion. The guard 313 may be placed at suitable height to at least partially block upper containers within a stack in place. For example, the guard 313 may be sized to allow sliding of one container underneath the front bar of the guard 313, then insert a second container in over the top of the guard 313 and on top of the bottom container. So, when the top container is received, the bar of the guard 313 can be about midlevel (e.g., see FIG. 6 at 620) or other suitable position to resist the top container falling off the bottom in motion. In some embodiments, the front bar of the guard 313 may be a removable bar, or a removable chain that can be hooked and unhooked. In some embodiments, the cart frame 301 may include a screen 315 (e.g., see FIGS. 4 and 5) extending above the second height H2 to provide an additional barrier around stacked containers (e.g., see FIGS. 6 at 630 and 640) when the movable shelf 312 is moved to the storage position (e.g., at H2).

In some embodiments, the cart system 300 can include a display 350 configured to display details of the items supported by the cart frame 301, a location identifier of a staging area (e.g., a parking space 135 in the staging area 130 in FIG. 1), status of the battery 360, and/or other information that may be pertinent to usage of the cart system 300. The display 350 can be located above the battery 360 and powered by the battery 360. The display 350 can be positioned on an outer surface of the cart frame 301 or a cover of the lift 320.

In some embodiments, one or more sensors 340, 341, 342 can be disposed on the cart frame 301, the stationary shelf 311, and/or the movable shelf 312. The one or more sensors can include an object detection sensor, a proximity sensor, a pressure sensor, etc. For example, the sensors 340 and 342 can be positioned on outer faces of the base 309 to detect obstacles around the cart frame 301. Based on the sensor inputs, the cart controller 330 can be configured to control the motorized wheel 303 to stop, reverse, or take other suitable action to avoid collision with the obstacle. Similarly, the sensor 341 can be disposed on an outer surface (or underside surface facing the stationary shelf 311) of the movable shelf 312. The sensor 341 can also be an object detection sensor to detect a presence of a portion of an operator between the stationary shelf 311 and the movable shelf 312 and/or the presence of items on the stationary shelf 311. Based on the signal from the sensor 341, the cart controller 330 can send a stop signal to the lift 320 to stop and/or prevent motion of the movable shelf 312, such as to avoid impact of the movable shelf 312 against items that may be received on the stationary shelf 311 and/or in a space below the movable shelf 312.

Figure 6:
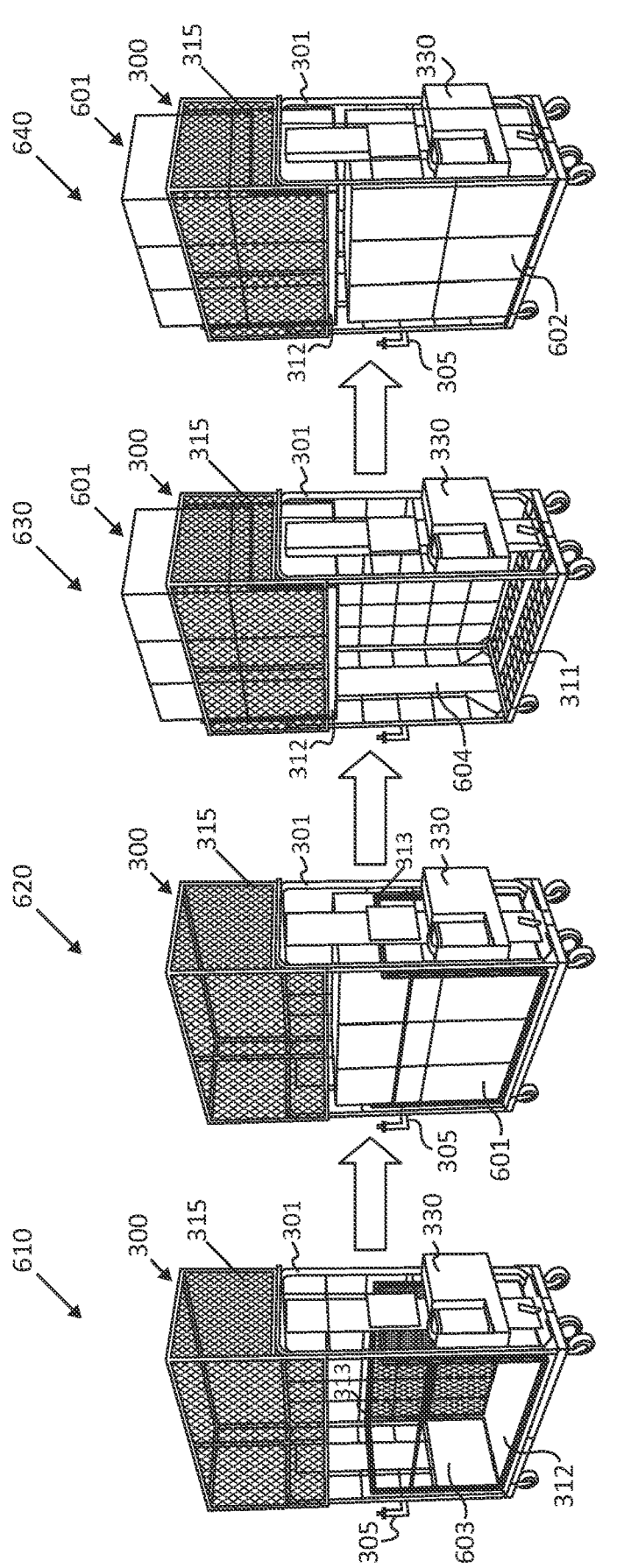
FIG. 6 illustrates stages in a process of loading packages on the cart system of FIG. 3.

FIG. 6 illustrates stages in a process of loading packages on the cart system 300. The cart system 300 can be employed for picking and staging items in an inventory system (e.g., 100 in FIG. 1). As illustrated, operation 610 can involve lowering the movable shelf 312 of the cart system 300 to a first height (e.g., H1) to load a first set of items on the movable shelf 312. The first height H1 can correspond to an ergonomic loading position for an operator. The lowering of the movable shelf 312 can be achieved via the height adjustment assembly (e.g., the lift 320) of the cart system 300. As shown, the movable shelf 312 can provide a first volume 603 accessible through an open front side for loading items therein. Lowering of the movable shelf 312 can involve receiving, via a height adjustor (e.g., the down button 334D in FIG. 3), the first height (e.g., H1).

Operation 620 can involve loading of containers 601 on the movable shelf 312. As illustrated, the containers 601 can be stacked on top of each other to form a two-level stack. Each of the containers 601 can include multiple items picked from inventory holders (e.g., 121 in FIG. 1). Each such container can be heavy (e.g., 20 lbs. to 50 lbs.), hence loading at an ergonomic position is advantageous to reduce fatigue to operators. In the illustrated embodiments, six containers can be stacked to form two levels with three containers on each of the two levels. For example, the bottom three containers may be loaded at a first level from under the front bar of the guard 313 and the upper three containers may be loaded on top of the bottom containers from under or over the front bar of the guard 313.

Operation 630 can involve vertically raising, via a height adjustment assembly (e.g., lift 320) of the cart system 300, the movable shelf 312 to a second height (e.g., H2). The second height can be at or above a shoulder of the operator. Moving the movable shelf 312 provides a changing volume 604 under the movable shelf 312. The movable shelf 312 positioned at the second height (e.g., H2) provides an upper bound of the second volume 604 and the stationary shelf provides a lower bound. Raising of the movable shelf 312 can involve receiving, via a height adjustor (e.g., the up button 334U in FIG. 3), the second height (e.g., H2). At the second height H2, the items 601 can be positioned within an enclosure formed by the screen (e.g., 315).

Operation 630 can involve receiving a second set of containers 602 on the stationary shelf 611 and within the second volume 604. The second set of containers 602 can be six containers stacked to form two levels, with three containers on each of the two levels. Thus, the cart frame 301 can carry twelve containers. This way, the cart system 300 doubles a storage capacity compared to traditional carts with only single shelf.

Subsequent to loading the containers 601, 602, the process can involve controlling, via a motion controller on a handle (e.g., 305) of the cart frame 301, the motorized wheel 303 of the cart system 300 to route the cart frame 301 to a staging area (e.g., 130 in FIG. 1) of the inventory system (e.g., 100). While moving, the cart frame 301 carries the first set of items 601 on the movable shelf 312 and with the second set of items 602 on the stationary shelf 311. For example, controlling the motorized wheel 303 can involve receiving a forward or a reverse drive command via the motion controller. Further, the cart frame 301 can be directed in a desired direction while inputting the forward or reverse drive command via the joystick 332 of the handle 305. The cart frame 301 can be directed by pulling or pushing on the handle 305 of the cart frame 301.

During unloading, the second set of containers 602 on the stationary shelf 311 may be unloaded first. Subsequently, the movable shelf 312 may be lowered to the first height so that the first set of containers 601 can be at an easy to unload ergonomic height. In some embodiments, the sensors (e.g., 341 in FIG. 3) may be used to detect whether all the containers 602 are unloaded before lowering the movable shelf 312. If the sensor (e.g., 341) detects a container on the stationary shelf 311, the movable shelf 312 may be stopped from lowering by the cart controller (e.g., 330).

In some embodiments, a cart system may include a different height adjustment mechanism. For example, as discussed in FIG. 2, the cart system may include a movable shelf tiltable by a tiltable bracket. Accordingly, the movable shelf may be referred as a tiltable shelf in some embodiments. Another implementation of the cart system is discussed with FIG. 7 to FIG. 13 below.

Figure 7:
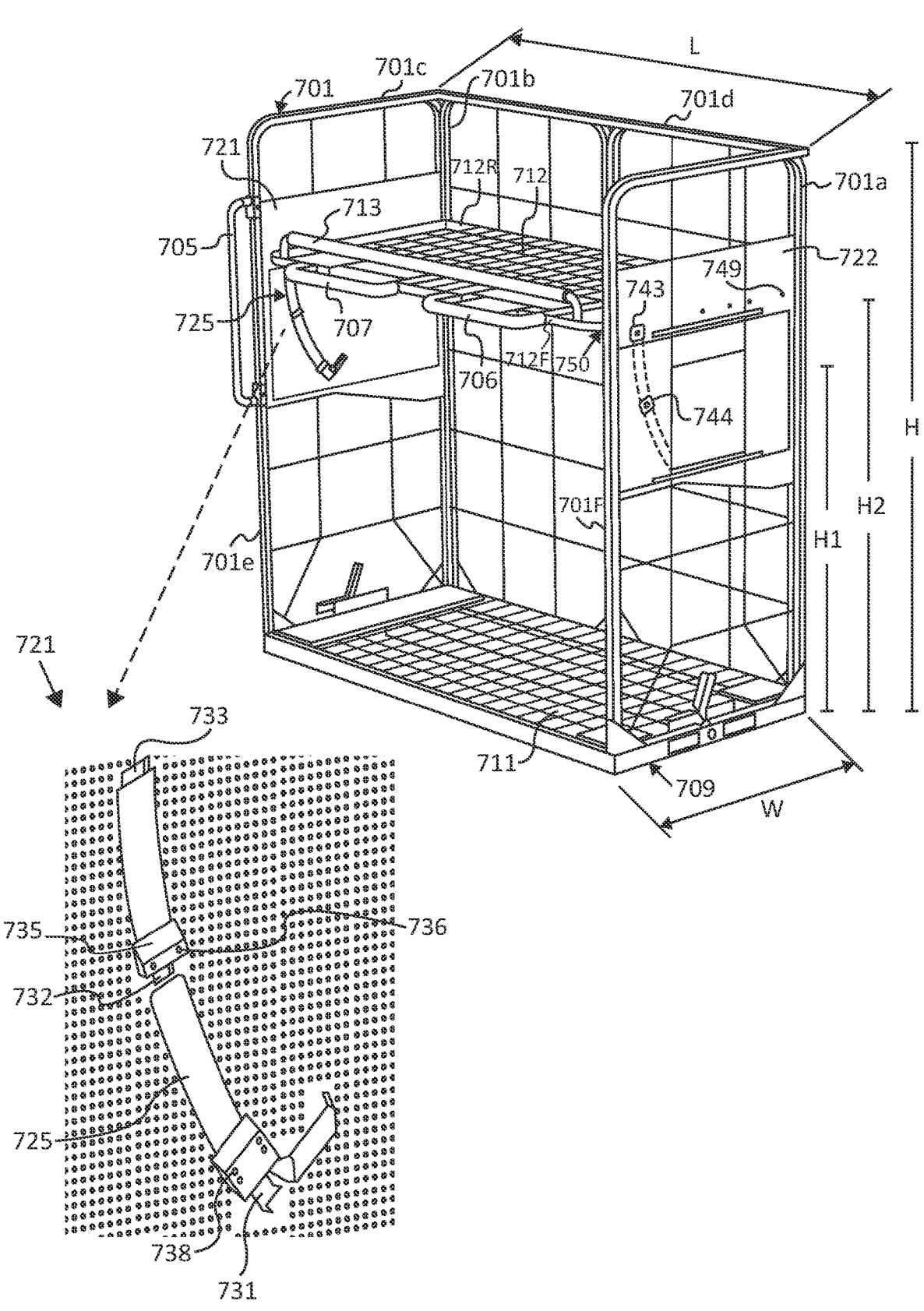
FIG. 7 is an example cart system of FIG. 2 employing a tiltable shelf.

FIG. 7 depicts a cart system 700 employing a tiltable shelf, according to various embodiments. The cart system 700 can be an example of implementation of the cart system 200 of FIG. 2. The cart system 700 also facilitates loading items on a stationary shelf and a tiltable shelf at an ergonomic position of an operator. This way, the cart system 700 can double or otherwise increase the items carrying capacity of a cart.

In the illustrated embodiments, the cart system 700 can include a cart frame 701 configured to receive items on two different shelves at easy to load ergonomic positions. The cart frame 701 can include a base 709, a stationary shelf 711, a tiltable shelf 712, and support panels 721, 722 (an example of tilt bracket 223 in FIG. 2). The base 709 can be located along a bottom level. The stationary shelf 711 can be supported by or incorporated into the base 709. The stationary shelf 711 can extend along a horizontal plane to receive a set of items (e.g., stacked on each other in two levels). The tiltable shelf 712 can occupy a horizontal configuration (e.g., in FIGS. 7 and 9) and a tilted configuration (e.g., in FIG. 8). Another set of items (e.g., 801) can be loaded on the tiltable shelf 712 in the tilted configuration and moved to the horizontal configuration.

Figure 8:
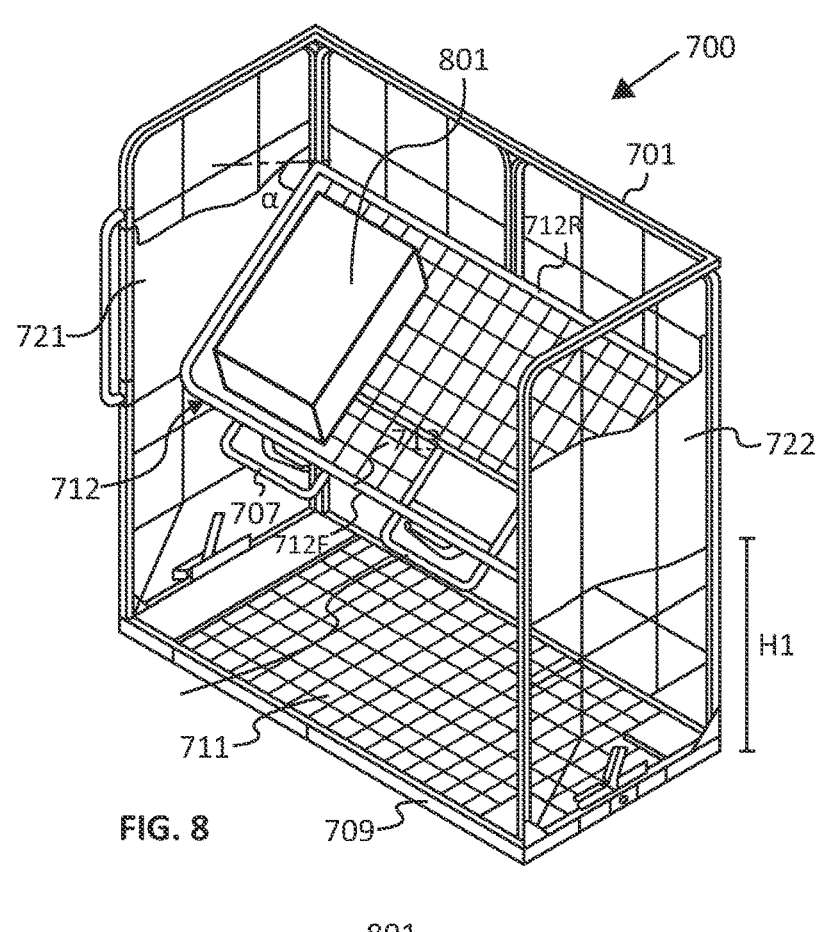
FIG. 8 illustrates the cart system of FIG. 7 with a shelf in a tilted position for loading a package.
Figure 9:
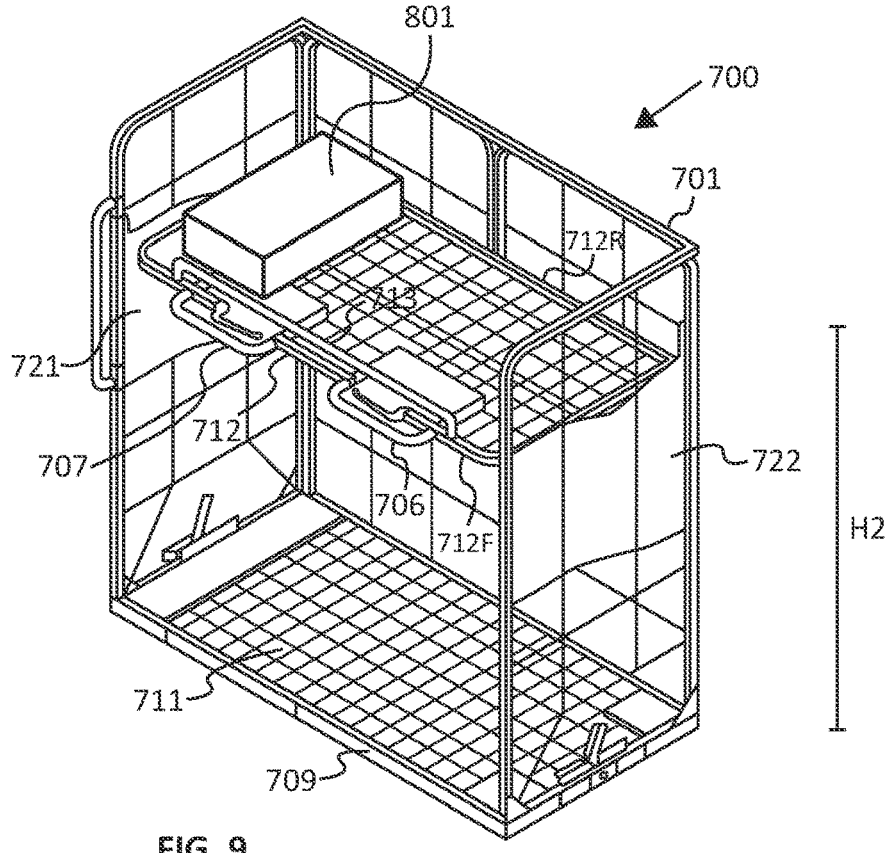
FIG. 9 illustrates the cart system of FIG. 7 with the shelf in a horizontal position subsequent to loading the package in FIG. 8.

For example, as illustrated in FIG. 8, the tiltable shelf 712 can be tilted to receive an item 801. A set of such items may be arranged next to each other or stacked on each other. In the tilted position, the item 801 can be loaded in an ergonomic position e.g., a waist level of an operator, below shoulder level of an operator, etc. The tiltable shelf 712 can include a guard rail 713 to prevent the item 801 from sliding off the shelf 712. Once the items 801 are loaded, the tiltable shelf 712 can be moved to the horizontal position, e.g., to the position shown in FIG. 9. This creates space to load more items underneath on the stationary shelf 711. Thus, the tiltable shelf 712 facilitates additional storage capacity as well as improves operating conditions for operators by providing an ergonomic loading position.

Referring back to FIG. 7, the cart frame 701 can have similar construction as the cart frame 301 (e.g., in FIG. 3). For example, the cart frame 701 can include elongated frame elements 701a-701f connected together to form a rectangular cage-like structure, however other structures are possible. Several of the frame elements (e.g., 701a, 701b, 701e and 701f) can extend vertically from the base 709. The cart frame 701 can be bounded by a rear portion (e.g., elements 701d), side portions (e.g., 701c, 701e, 701f), and a bottom portion (e.g., the base 709). A front side of the cart frame 701 can be open to receive containers on the shelves 711, 712. A top side of the cart frame 701 can also be open to allow vertical movement of the movable shelf 712 loaded with items (e.g., 801). A handle 705 can be attached to or integrally formed with the side frame element 701e on the front side of the cart frame 701 or the handle 705 can be part of the support panel 721. The handle 705 can be gripped to steer the cart frame 701 in a desired direction. The cart system 700 is not limited to the illustrated handle 705. The cart frame 701 can include other handle structures such as a handle (e.g., 305 in FIG. 3) with a joystick (e.g., 332 in FIG. 3), although these are omitted here for ease of viewing other features.

The tiltable shelf 712 can be located above the stationary shelf 711. The tiltable shelf 720 can be pivotably coupled to the support panel 721, 722 to move the tiltable shelf 712 between a horizontal configuration (e.g., in FIGS. 7 and 9) and a tilted configuration (e.g., in FIG. 8). For example, the tiltable shelf 712 can include a front portion 712F and a rear portion 712R. Ends (e.g., left and right ends) of the rear portion 712R can be pivotably coupled at pivot points 739 and 749 of the panels 721, 722, respectively. As the tiltable shelf 712R is moved, it pivots about the rear portion 712R, e.g., such that the front portion 712F can move between the first height H1 (e.g., an ergonomic position) and the second height H2 (e.g., a storage position).

In some embodiments, the tiltable shelf 712 can include one or more shelf handle 706, 707. An operator can use the shelf handles 706, 707 to move the tiltable shelf 712.

Figure 14:
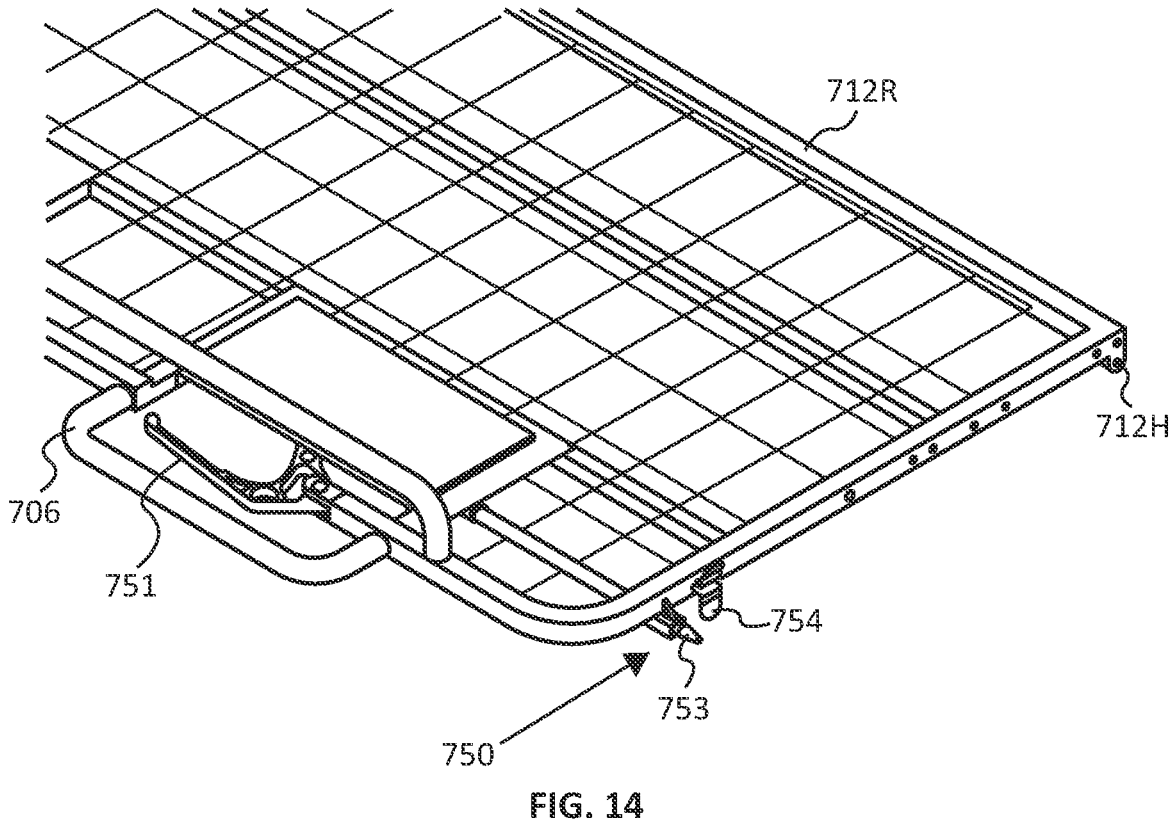
FIG. 14 illustrates an example lock of the shelf of FIG. 12.

As illustrated in FIG. 14, in some embodiments, the tiltable shelf 712 can include a shelf locking member 750 to maintain the tiltable shelf 712 in a desired position (e.g., horizontal or tilted). The shelf locking member 750 can be configured to engage with the support panels 721, 722 (e.g., FIG. 7). The shelf locking member 750 can be actuated to engage with a corresponding receiving member of the support panel 721, 722. Although one example of a shelf locking member 750 is illustrated in FIG. 14 and will now be described, other locking mechanisms are also possible.

As illustrated in FIG. 14, the shelf locking member 750 can include a lever 751 coupled to a rod 753. The rod 753 can extend at least partially along a length of the tiltable shelf 712. The lever 751 can be coupled to the shelf handle 706 (or other portion of the tiltable shelf 712 to be reachable from the shelf handle 706 or otherwise accessible for an operator to use) and configured to be squeezed or released to actuate the rod 753. This way, the rod 753 can be moved back and forth along the length of the shelf 712. In some embodiments, a spring may be coupled to the rod 753 to automatically retract the rod 753 when the lever 751 is released.

Referring to FIGS. 7 and 11-13, the support panels 721, 722 can be coupled on opposite sides of the cart frame 301. In some embodiments, the support panels 721, 722 may be integrally formed with the cart frame 301. For example, as illustrated, a left support panel 721 can be coupled to frame elements (e.g., 701b and 701e) on a left side of the cart frame 301, and a right support panel 722 is coupled to frame elements (e.g., 701a and 701f) on a left side of the cart frame 301. The support panels 721, 722 can be configured to pivotably support the tiltable shelf 712. The support panels 721, 722 can facilitate movement of the tiltable shelf 712 between a first height H1 (e.g., a storage height above an operator's shoulder) and a second height H2 (e.g., an ergonomic loading height above at an operator's waist level). For example, the support panels 721, 722 can include inwardly facing surfaces (i.e., facing towards the shelf 712) that can include components and structural features engageable with the tiltable shelf 712 to facilitate tilting. The support panels 721, 722 can be structurally similar to one another e.g., having similar structures on the inwardly facing surfaces.

Figure 10:
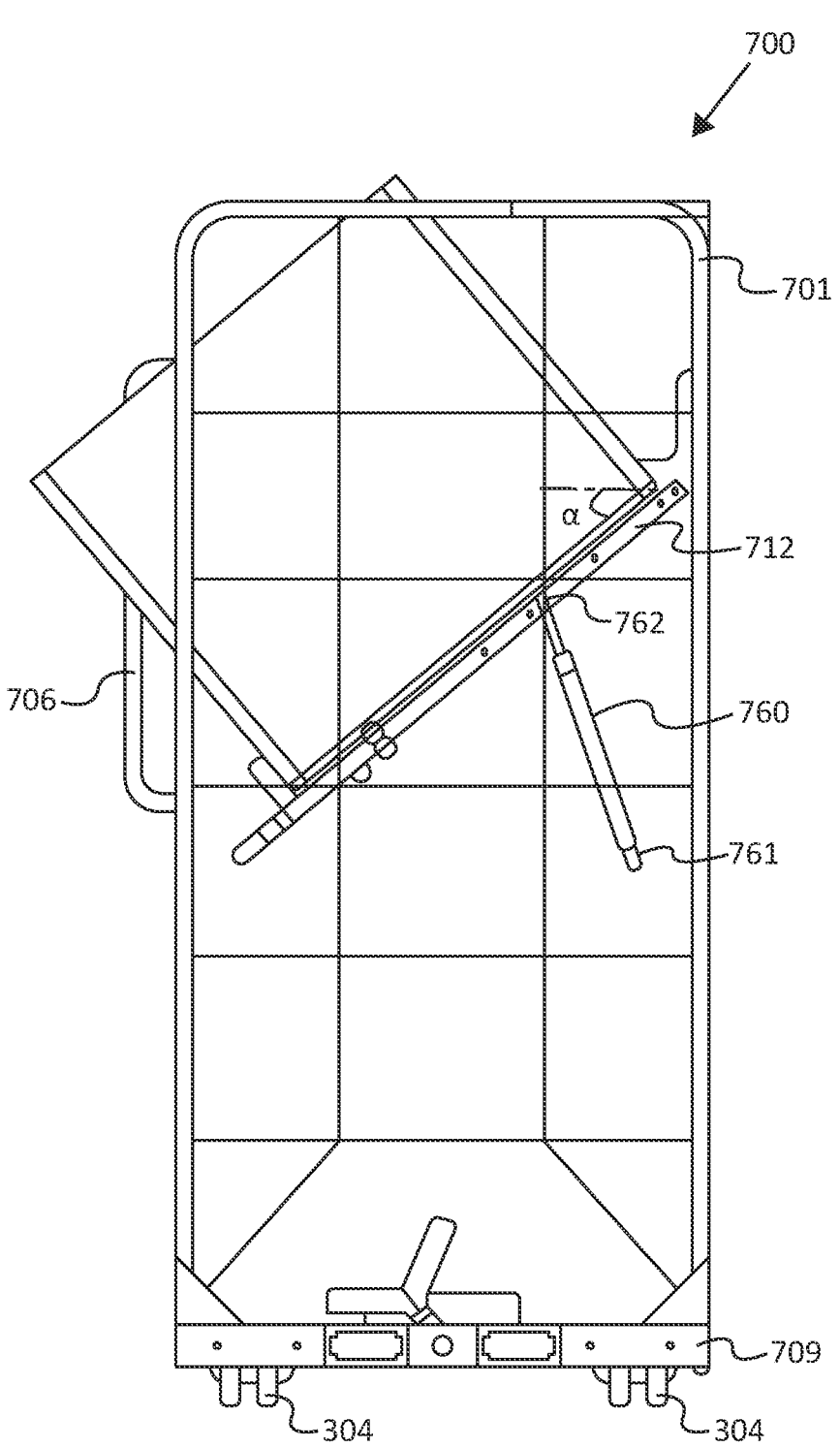
FIG. 10 illustrates a side view of the cart system of FIG. 7 with a shelf in a tilted position.
Figure 11:
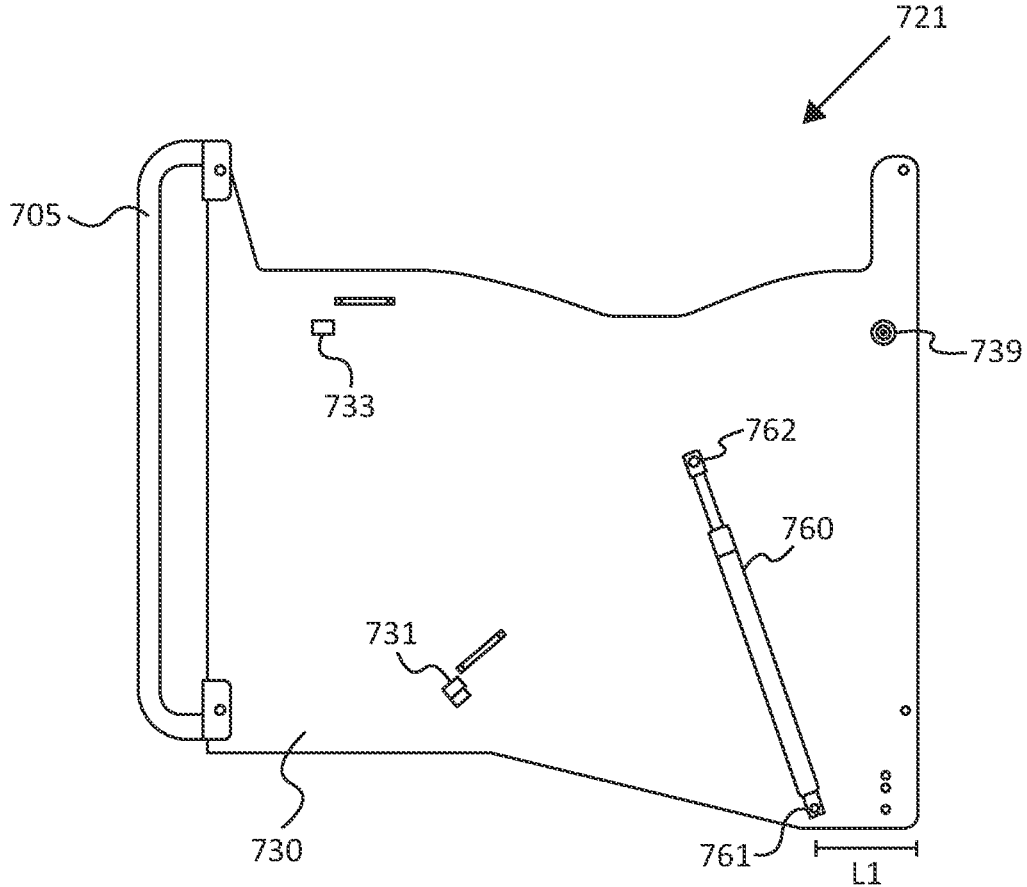
FIG. 11 illustrates a panel configured to couple with and tilt the shelf of the cart system of FIG. 7.
Figures 12, 13:
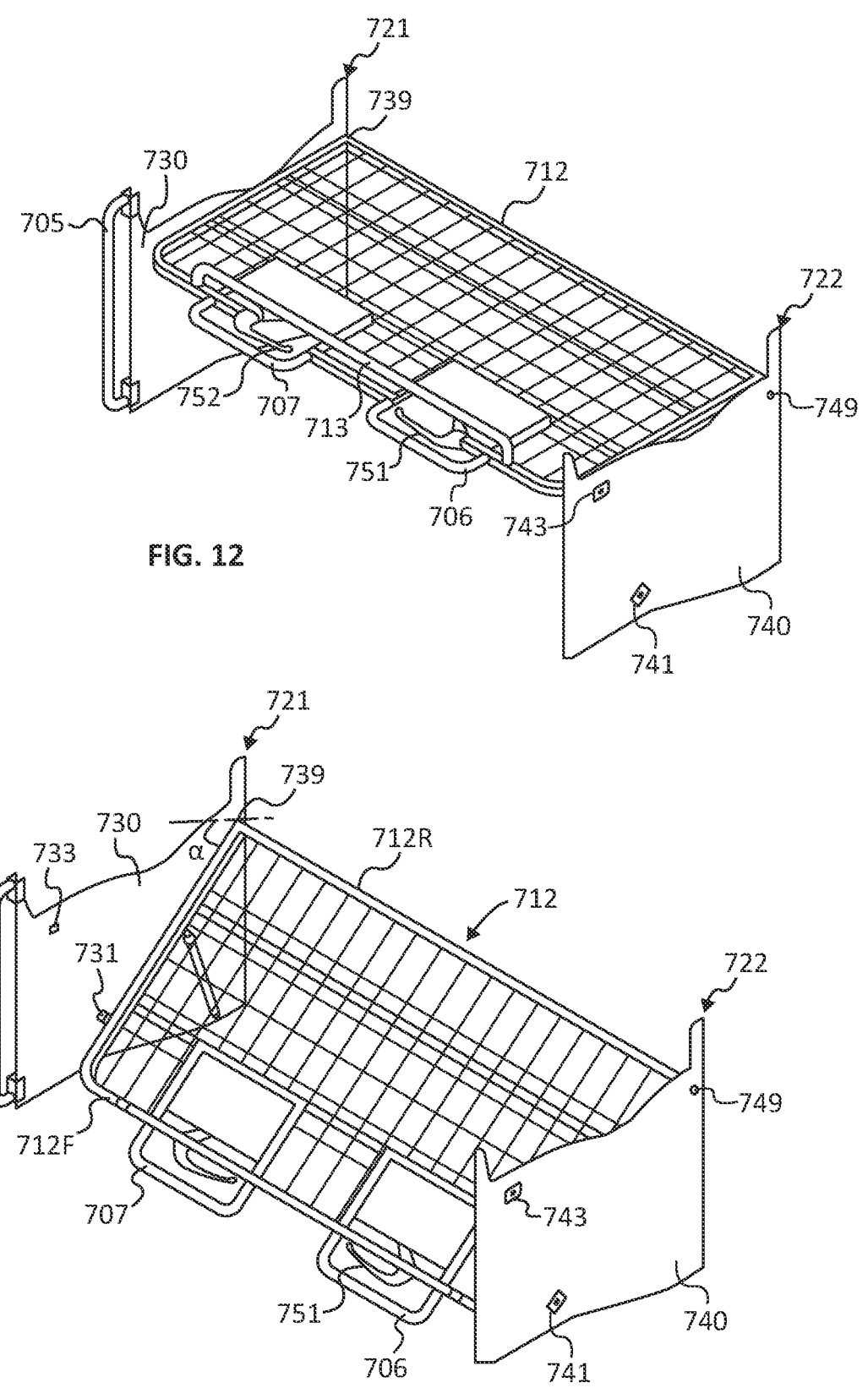
FIG. 12 illustrates the shelf of the cart system of FIG. 7 coupled to panels of FIG. 11 and in a horizontal position.
FIG. 13 illustrates the shelf of FIG. 12 moved to a tilted position.

FIG. 11 illustrates an example structure of the inner face of the support panel 721. The support panel 721 can include a first lock slot 731 and a second lock slot 733. The second lock slot 732 can be positioned above the first lock slot 731. The first lock slot 731 can engage with the shelf locking member 750 (e.g., the rod 753 seen in FIG. 14) to maintain the tiltable shelf 712 in a tilted position. In some embodiments, the first lock slot 731 can be vertically and horizontally offset with respect to the second lock slot 733. In an example, the first lock slot 731 can be positioned to maintain the tiltable shelf 712 at an angle in a range a (e.g., see FIG. 10, 13) between 35°-45° with respect to the horizontal plane. The second lock slot 733 can be configured to engage with the shelf locking member 750 (e.g., the rod 753 seen in FIG. 14) to maintain the tiltable shelf 712 in a horizontal position. For example, in the horizontal position, the tiltable shelf 712 can have an angle of approximately 0° with respect to a horizontal plane. In some embodiments, the horizontal position may indicate the tiltable shelf 712 is maintained within a range of −5° to 5° with respect to the horizontal plane. For example, such minor tilting may occur due to items shifting on the shelf. In some embodiments, an additional slot (e.g., 732 in enlarged view of the panel 721 in FIG. 7) may be included to tilt the shelf 712 at a different angle e.g., in a range between 200-250 with respect to the horizontal plane. For example, a third lock slot (e.g., 732) can be located between the first lock slot 731 and the second lock slot 733. The third slot 732 can maintain the tiltable shelf 712 at an angle in a range between 200-250 with respect to the horizontal plane. The third slot 732 can provide less tilting compared to the second slot 733. This can be advantageous to allow for stacking of items without sliding over the items underneath. This lesser tilting can also be used by operators of different heights. In some embodiments, the third slot 732 can prompt an operator to continuously hold one or more of the handles 706, 707 when moving the tiltable shelf 712 from the tilted position to the horizontal position. This can ensure the tiltable shelf 712 is properly positioned in the horizontal positions so that the shelf 712 does not return back to its tilted position due to gravity or weight of the items, or return overly abruptly to the horizontal position under the influence of an urging element (e.g., 760 discussed below). For example, if the operator disengages the shelf locking member 750 from the tilted position and simply pushes the tiltable shelf 712 upward and lets go of the handle 706, the shelf locking member 750 can engage with the third slot 732 and stop the shelf 712 from moving upward until the operator again disengages the shelf locking member 750 from the third slot 732 to continue movement of the shelf 712 toward the horizontal position.

In some embodiments, referring to FIG. 7, the support panel 721 (see enlarged view) can include an arcuate plate 725 couplable to ends of the front shelf portion 712F of the tiltable shelf 712. The arcuate plate 725 can be fixedly attached to and/or incorporated into the inner surface of the support panel 721. The arcuate plate 725 can be configured to guide a tilting motion of the front shelf portion 712F. The arcuate plate 725 can include a lock ramp (e.g., 736, 738) positioned at each of the lock slots (e.g., 731, 732). The lock ramp (e.g., 736, 738) can be engageable with the shelf locking member 750 (e.g., the rod 753 in FIG. 14). The lock ramps (e.g., 736, 738) can include a ramp surface (e.g., 735) that is inclined with respect to the arcuate plate 725. When the tiltable shelf 712 is moved downward, the ramp surface (e.g., 735) can push the shelf locking member 750. In some embodiments, the lock ramps 736, 738 can ensure the tiltable shelf 712 is securely locked to advantageously prevent any accidental unlocking of the tiltable shelf 712 while loading or unloading the items. As illustrated, the first lock slot 731, and the second lock slot 733 can be spaced along a curved path of the arcuate plate 725.

In some embodiments, referring to FIGS. 10 and 11, the cart system 700 can include an urging element 760 coupled to the support panel 721 and a bottom of the tiltable shelf 721. The urging element 760 can assist an upward movement of the tiltable shelf 712 when moving from the tilted position to the horizontal position. For example, the urging element 760 includes a first end 761 and a second end 762. The first end 761 may be pivotably coupled to the support panel 721 (see FIG. 11) at a distance L1 offset from its rear portion. The second end 762 can be coupled to the bottom surface of the tiltable shelf 712 (see FIG. 10). The urging element 760 can be piston-cylinder actuated by hydraulic or pneumatic pressure. The hydraulic or pneumatic pressure can provide additional push forces at the bottom of the tiltable shelf 712 when lifting the tiltable shelf 712 loaded with items. Thus, a heavily loaded shelf can be easily movable with minimal manual effort. The present disclosure is not limited to a particular urging element and other urging elements such as a spring, elastic member, or other components are possible.

In some embodiments, although not illustrated, the cart frame 701 can be coupled with a motorized wheel, swivel wheels, and a cart controller. For example, as similar to discussion with respect to FIG. 2 and FIG. 3, the cart system 700 can include the motorized wheel (e.g., same as the wheel 303 of the cart frame 301) and swivel wheels (e.g., same as the wheel 304 of the cart frame 301), and the cart controller (e.g., 330 of the cart frame 301). Similar to that shown in FIG. 3, the cart frame 701 can include the motorized wheel coupled to the base 709. The cart controller can be configured to receive drive input and control the motorized wheel based on the drive input to guide the cart frame 701 between the pickup area and the staging area. The cart frame 701 can include other handle structures e.g., similar to the cart frame 301. For example, the cart frame 701 can include the handle (e.g., 305) and the joystick (e.g., 332) to provide drive inputs for driving of the motorized wheel (e.g., 303) of the cart frame 701.

Additionally or alternatively, one or more sensors (e.g., same as 340, 341, 342 in FIG. 3) can be disposed on the cart frame 701, the stationary shelf 711, and/or the tiltable shelf 712. The one or more sensors can be object detection sensors, proximity sensors, pressure sensor, etc. For example, the sensors (e.g., 340 and 342) can be positioned on outer faces of the base 709 to detect obstacles around the cart frame 701. Based on the sensor inputs, the cart controller (e.g., 330) can be configured to control the motorized wheel (e.g., 303) to avoid collision with surrounding objects. In some embodiments, sensor (e.g., 341) can be positioned on the tiltable shelf to facilitate object detection e.g., containers or operator between the tiltable shelf 712 and the stationary shelf 711. If an object is detected, the tiltable shelf 712 may be prevented from tilting or an alarm (e.g., audio or visual) may be sounded.

Additionally or alternatively, the support panel 721, 722 can be mounted on a lift (e.g., 320 in FIG. 3). That way, the support panel 721, 722 can be moved vertically along with the tiltable shelf (e.g., in a tilted position or a horizontal position). Additionally or alternatively, although examples herein primarily discuss a single moveable shelf and a single stationary shelf, multiples may be used. For example, multiple movable shelves may be implemented over a single stationary shelve or over multiple stationary shelves. Generally, some options relating to multiples are further graphically represented in FIG. 2, where respective elements are graphically depicted in groups, although elements depicted in multiples may be present in singles or vice versa. Generally, one or more individual elements of one grouping may interact in suitable one-to-one, one-to-many, or many-to-many relationships with one or more elements in another grouping.

In some embodiments, a method of receiving and staging items in an inventory system can involve using the cart system 700. The process of loading the items can involve tilting a tiltable shelf of the cart system, receiving a first set of items on the tiltable shelf in a tilted position, repositioning the tiltable shelf to a horizontal position, and receiving a second set of items on a stationary shelf underneath the tiltable shelf. Once the items are loaded, the cart can be moved around, e.g., by controlling a motorized wheel to route the cart frame to a staging area of the inventory system (e.g., 100 in FIG. 1).

For example, as shown in FIG. 8, the tiltable shelf (e.g., 712) of the cart system (e.g., 700) can be moved to the tilted position. In the tilted position, the front shelf portion (e.g., 712F) can be at a first height (e.g., H1) corresponding to an ergonomic loading position of an operator. The tilting of the tiltable shelf (e.g., 712) can involve engaging a shelf locking member (e.g., 753, FIG. 14) with the first lock slot (e.g., 731, 741, FIG. 13) of a support panel (e.g., 721, 722). The operator can then load the first set of items (e.g., 801, FIG. 8) on the tiltable shelf (e.g., 712) in the tilted position.

Then, the tiltable shelf (e.g., 712) can be repositioned from the tilted position to a horizontal position (e.g., see FIG. 9) at a second height (e.g., H2). The second height can be at or above a shoulder of the operator. The repositioning of the tiltable shelf (e.g., 712) can involve disengaging the shelf locking member (e.g., 753, FIG. 14) from the first lock slot (e.g., 731, 741, FIG. 13) of the support panel (e.g., 721, 722) and pushing the tiltable shelf (e.g., 712) upward to the horizontal position (e.g., FIG. 12). The repositioning of the tiltable shelf (e.g., 712) can involve engaging the shelf locking member (e.g., 753, FIG. 14) with the second lock slot (e.g., 733, 743, FIG. 7) of the support panel (e.g., 721, 722). Operations may be substantially reversed for unloading and may include unloading the second set of items from the stationary shelf 711 underneath the tiltable shelf 711 so that the tiltable shelf 712 has space into which it can pivot to facilitate unloading from an ergonomic loading position.

Figure 15:
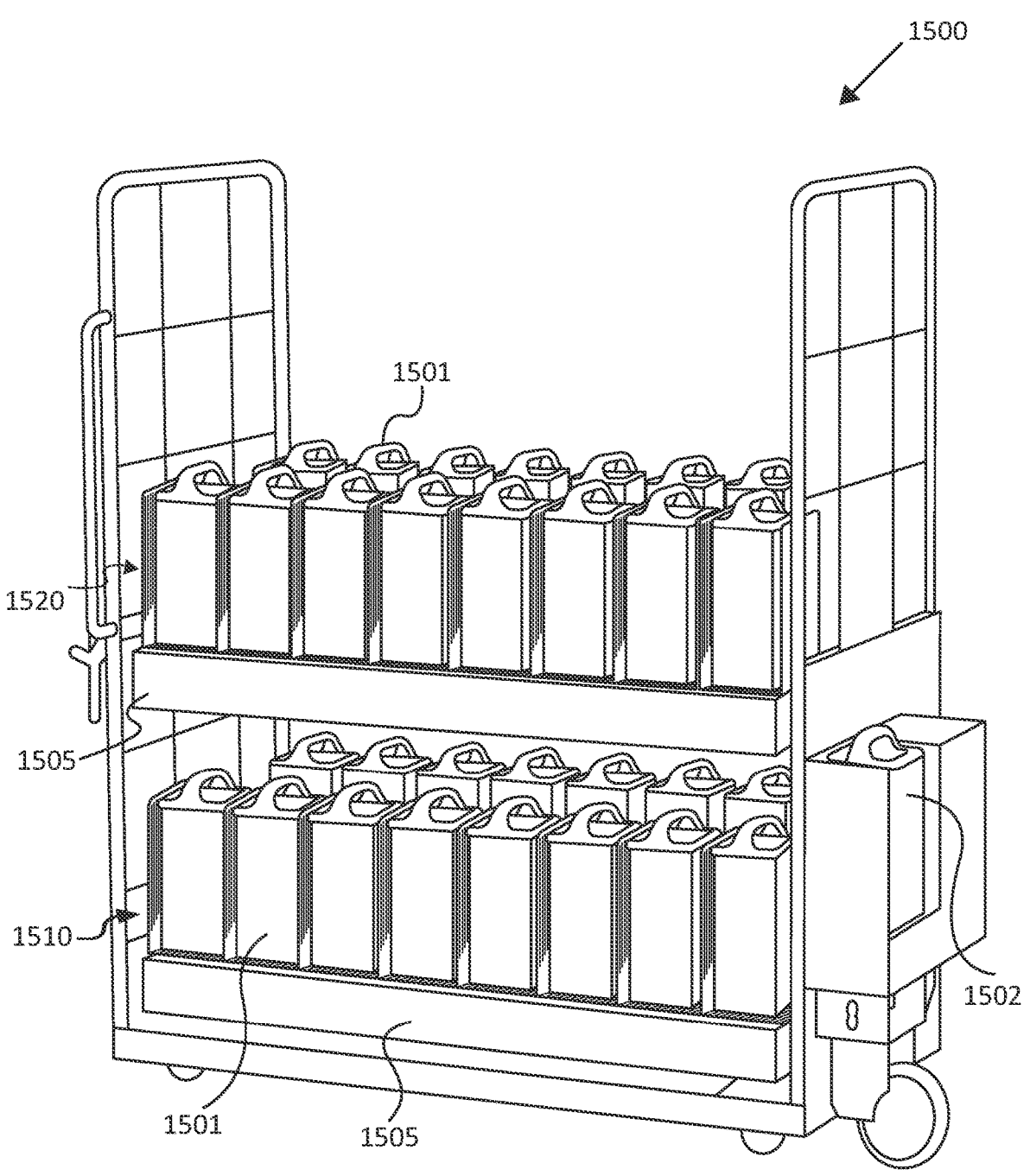
FIG. 15 illustrates an example battery charging cart movable within the inventory system of FIG. 1.

FIG. 15 illustrates an example of battery charging cart 1500 configured to move within an inventory system (e.g., 100). The battery charging cart 1500 can include one or more charging shelves (e.g., 1510 and 1520), e.g., which may be connected to cables, plugs, or other suitable connectors to permit plugging into a wall outlet or other suitable interface for drawing power from an electrical grid, utility power source, or other source of electrical power or energy. A charging shelf (e.g., 1510, 1520) can charge a fleet of batteries 1501. Each battery 1501 can be inserted in a corresponding charging port 1505. In some embodiments, the battery charging cart 1501 can include a motorized wheel power by a battery 1502. The battery charging cart 1500 can be used to swap out batteries (e.g., 360) from the cart system (e.g., 300, 700). For example, if a cart 200, 300, 700 runs out of battery, the battery charging cart 1500 can be mobilized (e.g., disconnected from charging infrastructure) and driven to that cart (e.g., 200, 300, 700) and swap out the depleted battery (e.g., 360).

The cart systems (e.g., 200, 300, 700) herein can be modified to remove or add components, and can be implemented in a wide variety of operating environments. The cart system can be configured to move around using different mechanisms such as rails, skid, robotic mobile drive unit, or other transportation systems. For example, wheels of a cart frame can be configured to move on a rail. The wheels can include a flange to securely move on the rail. The cart system can be moved using mobile drive unit such as the ones used to lift and move an inventory holder. For example, the mobile drive unit can be positioned under a base of the cart frame (e.g., 301, 701) to lift and move the cart frame. In some embodiments, the mobile drive unit can raise or lower the cart frame to adjust a loading height of the shelves. In some embodiments, the cart frame (e.g., 301, 701) can be modified to facilitate towing two or more cart frames together. For example, the cart frames can include a hitch ball, a hook, or other components to attach a rope, strap, a bar, etc. to tow or tug two or more carts together.

Some or all of the process described herein, or variations, and/or combinations thereof may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. An inventory system comprising a pickup area and a staging area, the inventory system comprising:
    a plurality of inventory holders located in the pickup area, each inventory holder comprising a plurality of items;
    a motorized cart system for receiving one or more picked up items of the plurality of items and staging the one or more picked-up items at a specified location within the staging area, the motorized cart system comprising:
    a cart frame comprising:
        a base;
        a handle with a joystick to provide a drive input; and
        a plurality of shelves for receiving the one or more picked up items, the plurality of shelves comprising a stationary shelf and a movable shelf, the movable shelf being movably stackable on top of the stationary shelf;
        an object detection sensor disposed on the movable shelf and configured to detect a presence of an object between the stationary shelf and the movable shelf;
    a motorized wheel coupled to the base and configured to propel the cart frame over a surface based on the drive input from the joystick; and
    a height adjustment assembly comprising:
        a lift coupled to the movable shelf and configured to control movement of the movable shelf along a vertical direction, the lift being configured to lower the movable shelf to a first height configured for loading a first set of items of the plurality of items onto the movable shelf, and to raise the movable shelf to a second height above the first height in the vertical direction to facilitate loading of a second set of items onto the stationary shelf beneath the movable shelf; and a lock configured to secure the movable shelf at a specified height; and a cart controller configured to receive the drive input from the joystick and a height input associated with the movable shelf, and control the motorized wheel and the lift based on the drive input, the height input, and sensor data from the object detection sensor, respectively.

2. The inventory system of claim 1, wherein the handle comprises a motion controller configured to drive the motorized wheel in a forward or a reverse direction, and a grip to steer the cart frame in a desired direction.

3. The inventory system of claim 1, wherein the lift comprises at least one of: a lead screw, a hydraulically or pneumatically actuated rod, a chain and sprocket, or belt and pulley system coupled to a guide rail.

4. The inventory system of claim 1, wherein the lock comprises a set of retractable pins, and the lift comprises holes corresponding to each of the retractable pins to secure the movable shelf.

5. The inventory system of claim 1, wherein the motorized cart system further comprises a display configured to display details of the first set of items and the second set of items supported by the cart frame and/or a location identifier of the staging area.

6. The inventory system of claim 1, wherein the lift is configured to maintain the movable shelf in a planar position while loading the second set of items or translating the movable shelf along the vertical direction, and wherein the movable shelf further comprises a guard extending around a circumference of the movable shelf to avoid items from falls off the movable shelf when in motion.

7. A motorized cart system comprising:

a cart frame comprising:

a base;

a handle to control movement of the cart frame; and a plurality of shelves comprising a stationary shelf and a movable shelf disposed above the stationary shelf, the movable shelf being moveable in a path of travel vertically overhead of the stationary shelf to change a volume between the movable shelf and the stationary shelf such that items are stackable over each other within the volume and supported by the stationary shelf;

an object detection sensor disposed on the movable shelf and configured to detect a presence of an object between the stationary shelf and the movable shelf;

a height adjustment assembly comprising a height adjustor configured to lower or raise the movable shelf in a vertical direction to an ergonomic height for loading the items and a storage height to store the items while creating sufficient volume below the movable shelf loading the items on the stationary shelf; and a cart controller configured to receive a height input associated with the movable shelf, and control the height adjustor based on the height input and sensor data from the object detection sensor.

8. The motorized cart system of claim 7, wherein the cart frame further comprises a motorized wheel coupled to the base and configured to propel the cart frame over a surface, the motorized wheel being powered by a battery.

9. The motorized cart system of claim 8, further comprising a battery bypass switch to bypass motorized operation of the motorized wheel and enable only manually driving of the cart frame.

10. The motorized cart system of claim 8, wherein the handle comprises a motion controller configured to receive a drive input to control the motorized wheel, and a grip to steer the cart frame in a desired direction.

11. The motorized cart system of claim 7, wherein the height adjustor comprises at least one of: a motor driven lead screw, a hydraulically or pneumatically driven extendible rod, a chain and sprocket driven by a motor, or a motorized belt and pulley system coupled to a guide rail.

12. The motorized cart system of claim 7, wherein the height adjustor is configured to move the movable shelf in a planar manner to a first height to load a first set of items on the movable shelf, and raise the movable shelf in the planar manner to a second height for loading a second set of items on the stationary shelf, wherein the second set of items are stackable over each other.

13. The motorized cart system of claim 7, wherein the motorized cart system further comprises a display configured to display details of the items on the cart frame and/or a location identifier of a staging area.

14. The motorized cart system of claim 7, further comprising: one or more object detection sensors to detect obstacles around the cart frame, wherein the cart controller is configured to control a motorized wheel to avoid collision with the detected obstacles.

15. The motorized cart system of claim 7, further comprising: a second movable shelf vertically stacked over the movable shelf, the second movable shelf coupled to the height adjustor and movable relative to the movable shelf.

16. A method of picking and staging items in an inventory system using a cart system comprising a cart frame with a stationary shelf, a movable shelf vertically movable over the stationary shelf, an object detection sensor disposed on the movable shelf and configured to detect a presence of an object between the stationary shelf and the movable shelf; and a height adjustment assembly, the method comprising:

detecting, via a cart controller using sensor data from the object detection sensor, whether an object is present between the movable shelf and the stationary shelf;

responsive to absence of the object, lowering, via the height adjustment assembly of the cart system, the movable shelf of the cart system to a first height to load a first set of items on the movable shelf, the first height corresponding to an ergonomic loading position for an operator;

vertically raising, via the height adjustment assembly of the cart system, the movable shelf to a second height, the second height being at or above a shoulder of the operator, the movable shelf at the second height providing an upper bound of a volume also bound by the stationary shelf;

receiving a second set of items on the stationary shelf and within the volume; and controlling, via a motion controller on a handle of the cart frame, a motorized wheel of the cart system to route the cart frame to a staging area of the inventory system with the first set of items on the movable shelf and with the second set of items on the stationary shelf.

17. The method of claim 16, wherein lowering or raising of the movable shelf comprises:

receiving, via a height adjustor of the cart system, the first height or the second height.

18. The method of claim 16, wherein controlling the motorized wheel comprises:

receiving a forward or a reverse drive command via the motion controller; and directing, via pulling or pushing on the handle of the cart frame, to a desired direction while inputting the forward or reverse drive command.

19. The method of claim 16, further comprising:

displaying, via a display on the cart frame, details of the first set of items and the second set of items on the movable shelf and the stationary shelf, respectively; and displaying, via the display, a staging location of the cart frame.

20. The method of claim 16, further comprising:

detecting, via an object detection sensor, presence of an object between the stationary shelf and the movable shelf; and stopping, via a height controller, motion of the movable shelf.

\* \* \* \* \*